Oct. 20, 1970     T. C. JEDNACZ     3,535,053

CONTROL SYSTEM FOR CENTRIFUGAL COMPRESSOR

Filed July 25, 1968     3 Sheets-Sheet 1

Inventor
Thomas C. Jednacz

By James J. Jennings, Jr.
Attorney

Oct. 20, 1970 — T. C. JEDNACZ — 3,535,053
CONTROL SYSTEM FOR CENTRIFUGAL COMPRESSOR
Filed July 25, 1968 — 3 Sheets-Sheet 2

Control Circuit 17

Inventor
Thomas C. Jednacz
By James J. Jennings, Jr.
Attorney

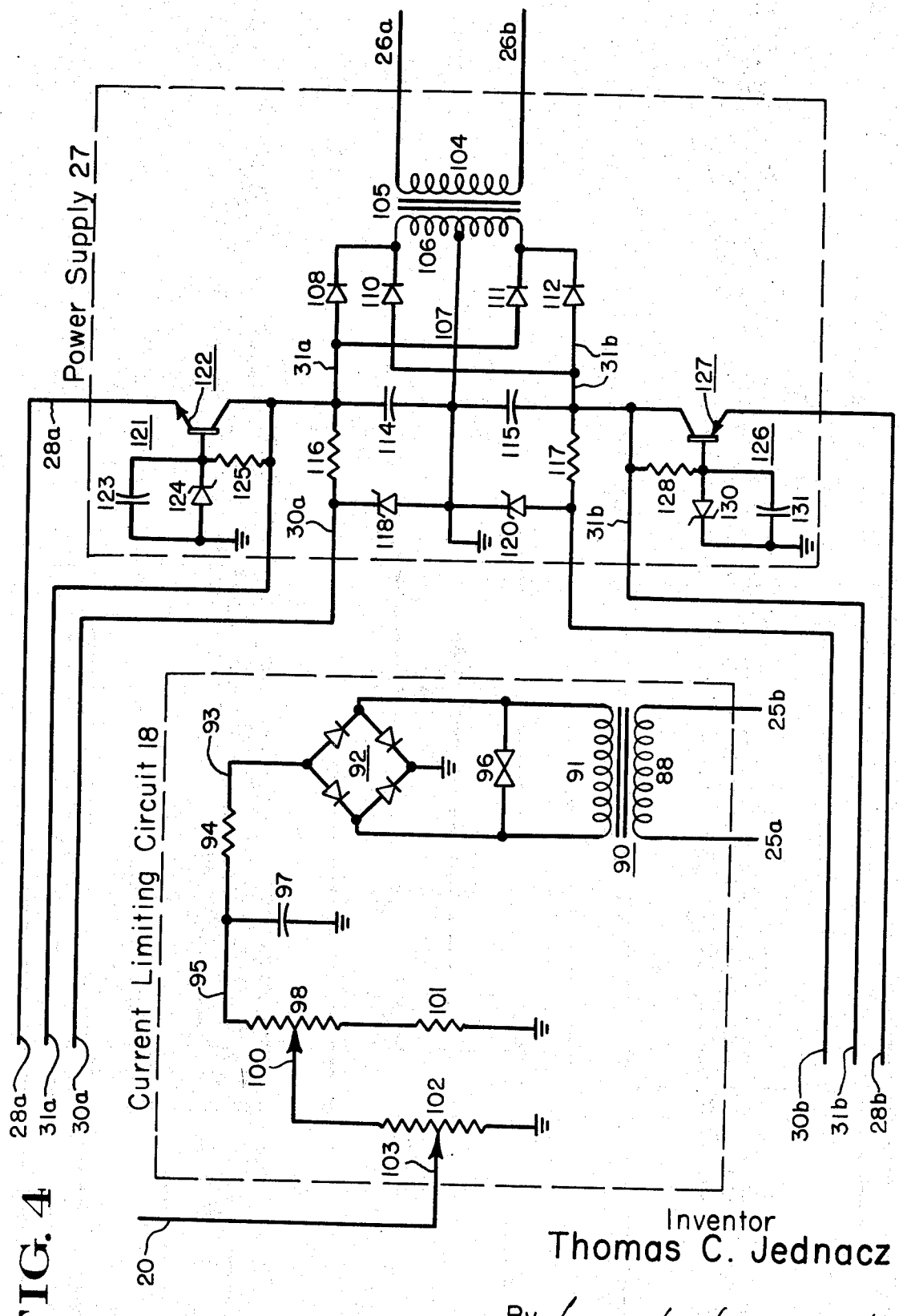

United States Patent Office 3,535,053
Patented Oct. 20, 1970

3,535,053
CONTROL SYSTEM FOR CENTRIFUGAL COMPRESSOR
Thomas C. Jednacz, York, Pa., assignor to Borg-Warner Corporation, Chicago, Ill., a corporation of Delaware
Filed July 25, 1968, Ser. No. 747,564
Int. Cl. F04b 27/00, 49/00
U.S. Cl. 417—18                                     11 Claims

ABSTRACT OF THE DISCLOSURE

The adjusting motor 13 shaft which positions the compressor vanes also provides an electrical signal which is balanced against a fluid temperature-sensing signal in an input circuit 10 to provide an output signal over a selector switch 41 to a D-C amplifier 15. A control circuit 17 responds to the polarity of the amplified output signal received at a first junction 64 and gates on the appropriate transistor switch 68, 72 or 81, 82 to actuate the related relay 76 or 83 to drive the adjusting motor in the correct direction to both adjust the compressor vane positions and rebalance the input circuit. An override signal, a function of the amplitude of the current drawn by the main motor which drives the compressor, is developed in a current limiting circuit 18 and inserted over a second junction 139 into the control circuit to override the amplified output signal when the main motor is already at rated load and thus prevent further loading of the compressor. A power supply 27 provides D-C energy for the D-C amplifier and control circuits, and provides a well-regulated voltage for the input circuit 10 which includes the fluid temperature-sensing element 11 and the motor-driven feedback potentiometer 35.

BACKGROUND OF THE INVENTION

Figure 1:
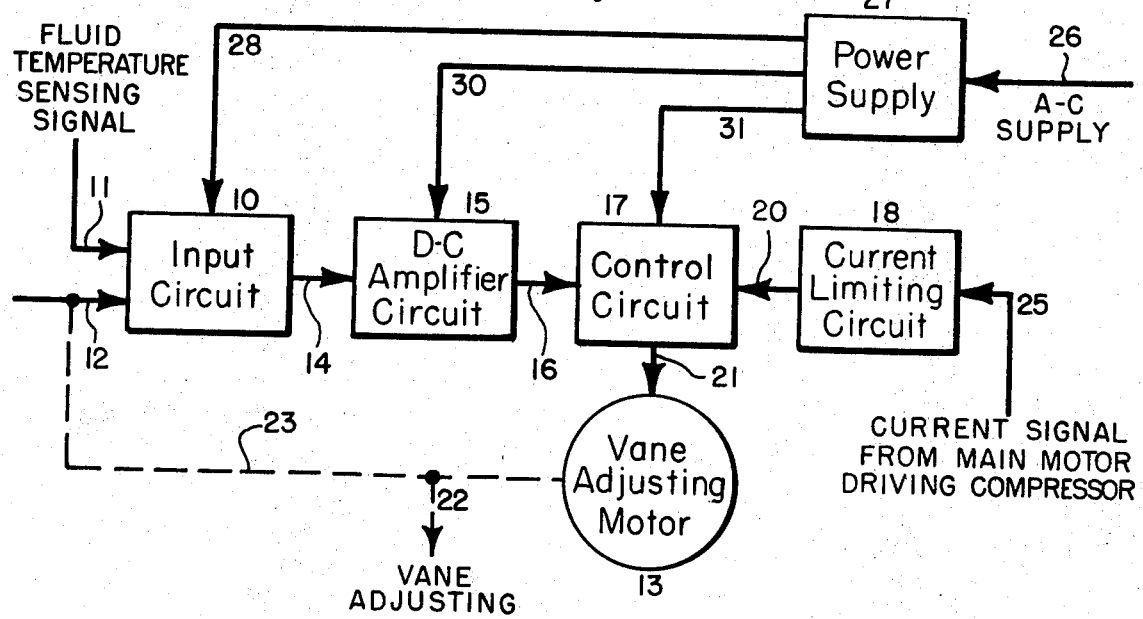

An air conditioning system is usually designed to handle the maximum cooling load that will be required. Because of cyclic weather fluctuations such systems generally operate at less than full load for a considerable portion of the year. Therefore, it becomes important to provide effective, efficient control of the system at less than full load to derive the maximum operating economies.

In a conventional system at part load the regulation may be achieved by "loading" and "unloading" the compressor. This can be accomplished by inlet guide vanes or prerotation vanes (PRV) in the compressor inlet, with a servo or small adjusting motor connected to operate the vanes as the adjusting motor is driven. As the adjusting motor is driven in one direction to close the vanes and throttle the flow, the capacity of the compressor is reduced. Conversely as the adjusting motor is driven in the opposite direction to open the vanes, the capacity of the compressor is increased. Changes in air conditioning load requirements can be detected by sensing the temperature (entering or leaving) of the water circulating in the compressor and thus providing an indication of the load conditions. Various control systems have been devised in attempts to regulate compressor loading in correspondence with the actual cooling demands imposed upon the system, but prior to this invention an economical, positive-operating and accurate system had not been provided.

SUMMARY OF THE INVENTION

The present invention includes a control system for governing the operation of a compressor driven by a main electrical motor, with an adjusting motor connected to effect compressor loading and unloading as a function of the temperature of a controlled fluid. The system includes an input circuit for providing an output signal which varies in accordance with the temperature of the controlled fluid, and an amplifier circuit is connected to amplify this output signal. A control circuit is connected to receive the amplified output signal. This control circuit includes switching means connected to operate, in response to the amplified output signal, to drive the adjusting motor which sets the vane positions to effect compressor loading and unloading. A current limiting circuit is connected to provide an override signal related to the amplitude of current flowing to the main motor, and to apply the override signal to prevent the control circuit from additionally loading the compressor after the main motor current reaches a predetermined level. Means is also provided for energizing the input, amplifier and control circuit to effect operation of the control system.

THE DRAWINGS

Figure 2:
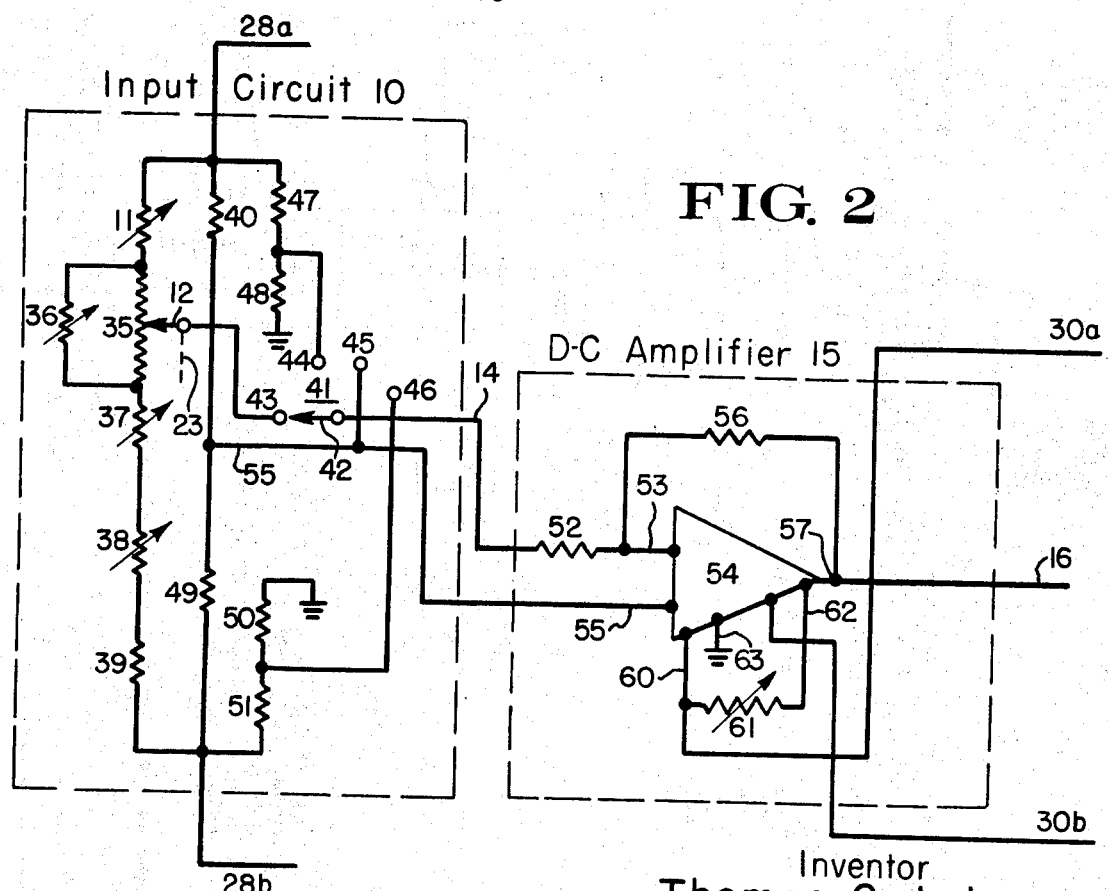
Figure 3:
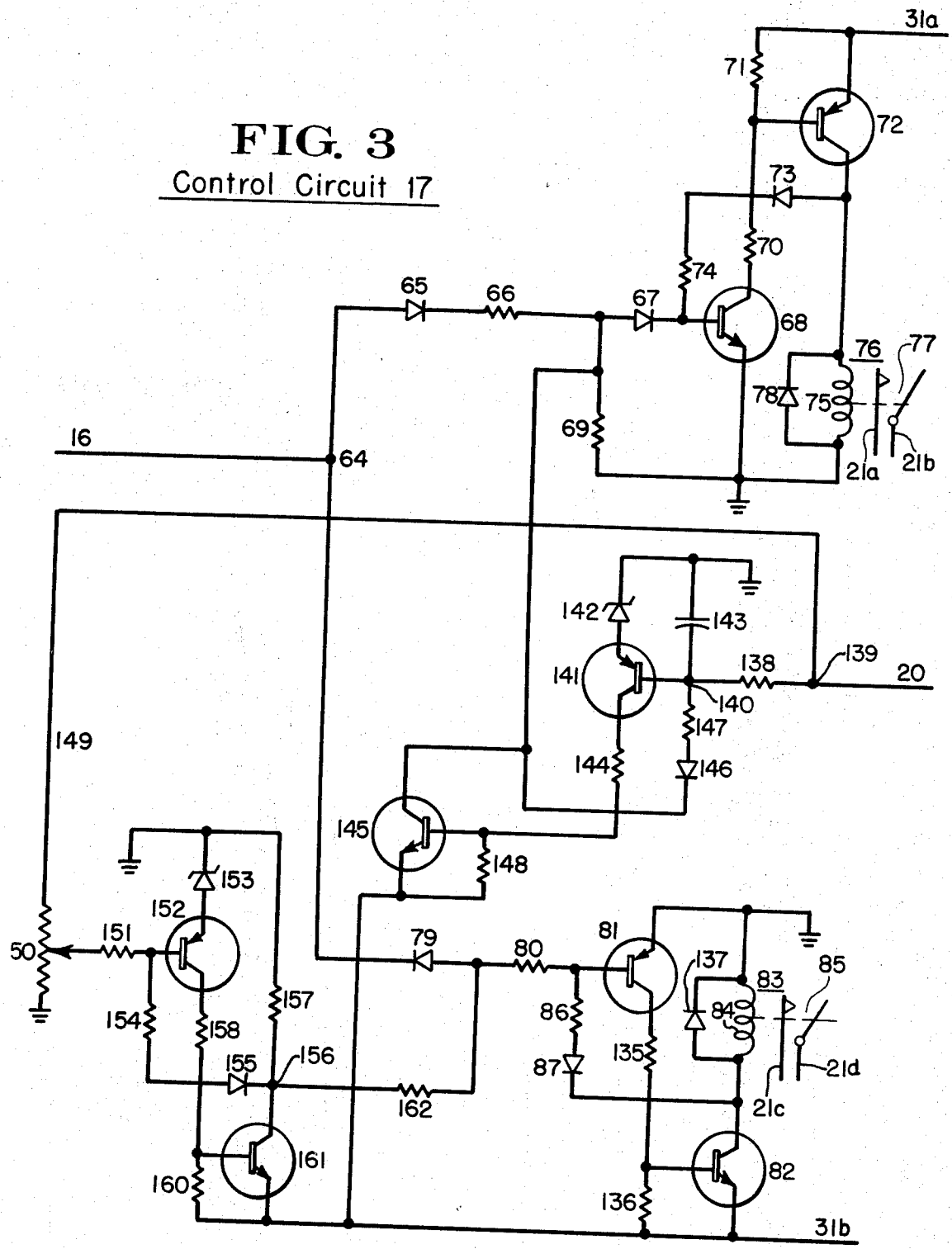

In the several figures of the drawings like reference numerals identify like elements, and in the drawings:

FIG. 1 is a block diagram of a control system in accordance with the inventive teaching; and FIGS. 2, 3 and 4 are schematic diagrams depicting circuit details of the system shown generally in FIG. 1.

GENERAL DESCRIPTION OF THE INVENTION

In the general system showing of FIG. 1, input circuit 10 receives a first input signal, denoting fluid temperature, over conductor 11 and a second input signal, related to the physical position of the shaft of vane adjusting motor 13, over a potentiometer arm 12. An output signal related to both inputs is provided by input circuit 10 and passed over conductor 14 to D-C amplifier 15, which in its turn passes the amplified output signal over line 16 to control circuit 17. A control signal is derived, as by a transformer, to signify the level of the current drawn by the main motor which drives the compressor, and this control signal or current signal is applied over line 25 to current limiting circuit 18. An override signal is provided by current limiting circuit 18 and applied over conductor 20 to control circuit 17. In response to these inputs control circuit 17 operates to provide motor control signal over line 21 to regulate operation of vane adjusting motor 13. As depicted by the broken line 22 a mechanical connection from the motor effects vane position adjustment and as shown by line 23, potentiometer arm 12 is also positioned as a function of the motor shaft position.

Alternating energy received over an A-C supply line 26 is passed to power supply 27. The power supply may be a conventional arrangement connected to rovide a well regulated D-C voltage over conductor 28 to the input circuit 10, and other D-C energizing potentials over conductors 30 and 31 to D-C amplifier 15 and to control circuit 17, respectively. Because other sources of unidirectional energy, such as a battery, could be substituted for the power supply 27, for the purposes of the present explanation and of the appended claims the "means for energizing" the input circuit, D-C amplifier circuit and control circuit is considered as the supply conductors (such as 28, 30 and 31) over which the unidirectional energy is passed to those circuits.

DETAILED DESCRIPTION OF THE INVENTION

Considering first input circuit 10 shown in FIG. 2, D-C energy is received from power supply 27 over conductors 28a and 28b and applied to the bridge circuit shown within the input circuit. The bridge circuit includes a fluid temperature-sensing potentiometer 11, which functions as a temperature-sensing element to provide resistance changes as a function of temperature changes in the control fluid. The bridge circuit further includes a feedback element, potentiometer 35, which has its adjustable arm 12 connected to be driven by the vane adjusting motor 13 to rebalance the input circuit. Also in the bridge circuit are a temperature calibration potentiometer 37, temperature set point adjustment potentiometer 38, and a resistor 39. Coupled in parallel with feedback potentiometer 35 is another potentiometer 36, which provides a manual adjustment over the operating range of temperature difference of the fluid. These components provide two legs of the bridge circuit, which legs are separated (in an electrical sense) at the point where arm 12 engages the winding of potentiometer 35. The other two legs of the bridge circuit are provided by resistors 40 and 49, with output conductor 55 coupled to the common connection between these two resistors.

Switch 41 is a manual/automatic selector switch and includes a movable arm or contact 42 which can be displaced to engage any of the fixed contacts or taps 43–46. The switch is shown in the automatic position, with the signal appearing on potentiometer arm 12 coupled over contacts 43 and 42 to the other output conductor 14. Thus in the automatic position of switch 41, the output signal from the bridge circuit is passed over output conductors 14, 55 to D-C amplifier circuit 15. When contact 42 is displaced to engage contact 44 the switch is in the "close" position, or that position in which the compressor is driven toward minimum capacity by adjustment of the vanes. Contact 44 is coupled to the junction between voltage divider resistors 47 and 48. The other end of resistor 47 is connected to conductor 28a, and the other end of resistor 48 is connected to a point of reference potential, commonly designated ground. It is noted that the term "ground" describes a reference potential, at a level intermediate a positive unidirectional potential applied over conductor 28a to the upper end of the bridge circuit in the input circuit, and a negative potential applied over conductor 28b to the other end of the bridge circuit in the input circuit 10. Contact 45 is coupled to output conductor 55, and this represents the "hold" or static position of the selector switch in which conductor 14 is directly coupled to conductor 55, and no change is made of the capacity. Contact 46 is connected to the common connection between voltage divider resistors 50 and 51. The other end of resistor 50 is grounded and the other end of resistor 51 is coupled to conductor 28b. When contact 42 is displaced to engage contact 46 switch 41 is in the "open" position in which the compressor vanes are driven to provide maximum capacity of the system.

Turning to D-C amplifier 15, conductor 14 is coupled over a resistor 52 to conductor 53. Thus the output signal received from the input circuit over conductors 14 and 55 is applied to the upper and lower input terminals of a D-C amplifier 54. A standard component suitable for employment as D-C amplifier 54 will be identified at the end of the specification. A resistor 56 is connected between conductor 53 and the output connection 57 of the D-C amplifier.

Four separate terminal connections are shown along the bottom of amplifier module 54. The first terminals is coupled over a conductor 60 to the D-C energizing conductor 30a, and the same terminal is also coupled over conductor 60, potentiometer 61 and conductor 62 to the fourth terminal. The second terminal is connected over conductor 63 to ground, and the third terminal is coupled to D-C energizing conductor 30b.

Considering now control circuit 17 in FIG. 3, the amplified output signal received over conductor 16 from D-C amplifier 15 is applied to a first junction 64. A series circuit including a diode 65, resistor 66 and another diode 67 is coupled between junction 64 and the base of an NPN type transistor 68, the emitter of which is grounded.

A resistor 69 is coupled between ground and the common connection between resistor 66 and diode 67. The collector of transistor 68 is coupled through a resistor 70 and another resistor 71 to conductor 31a. PNP type transistor 72 has its emitter coupled to this same conductor, and its base is coupled to the common connection between resistors 70, 71. Its collector is coupled along a first path through a diode 73 and resistor 74 to the base of transistor 68, and the collector of transistor 72 is also coupled through a second path including winding 75 of a relay 76 to ground. The relay includes a contact set 77 shown coupled to conductors 21a and 21b, which contact set is closed upon energization of relay 76 as current flows through winding 75. A protective diode 78 is coupled in parallel with winding 75 of the relay.

Those skilled in the art will appreciate that transistors 68, 72 and the associated circuit components cooperate as a single switching means, or a semiconductor switch, to effect rapid energizatiton of relay 76 when a signal of appropriate polarity appears at first junction 64. For example a signal of given polarity, positive-going for this explanation, appearing at first junction 64 is applied over diode 65, resistor 66 and diode 67 to the base of transistor 68, causing this transistor to begin to conduct. This provides a path for current flow from conductor 31a over resistors 71, 70 and the collector-emitter path of transistor 68. As this current flow begins to increase the potential between resistors 70 and 71 begins to go negative relative to the potential on conductor 31a, forward biasing transistor 72 and causing this transistor to begin conduction. As the emitter-collector resistance of transistor 72 decreases the potential between its collector and the top of winding 75 goes positive, and a signal of this polarity is applied over diode 73 and resistor 74 to the base of transistor 68, reinforcing the gating signal of this transistor. In turn conduction of transistor 68 increases and a more negative potential is applied to the base of transistor 72, which conducts more heavily. This cyclic feedback action occurs very rapidly so that provision of a small signal of appropriate polarity at the base of transistor 68 very rapidly drives transistors 68 and 72 into saturation, providing current flow through winding 75 which energizes relay 76 and closes contact set 77. Thus the designation of this circuit as a semiconductor switch, or a single switching means, is appropriate and accurate.

The first junction 64 is also coupled to a similar switching means, or a second semiconductor switch, shown in the lower right portion of FIG. 3. That is, terminal 64 is coupled through a diode 79 and resistor 80 to the base of a PNP transistor 81. The other transistor in the second switch is an NPN type transistor 82. In this circuit relay 83 includes a winding 84 operative to close a contact set 85 to intercouple conductors 21c and 21d upon operation of the relay. The circuit connections of resistor 86, diode 87, resistors 135, 136 and protective diode 137 are manifest from the previous description of the first semiconductor switch.

In the center of FIG. 3 conductor 20 is shown, and it is noted that this conductor applies the override signal from current limiting circuit 18 over a second junction 139 and a resistor 138 to a reference terminal 140. A PNP type transistor 141 has its base coupled to terminal 140 and its emitter coupled through a Zener diode 142 to ground. A capacitor 143 is coupled between terminal 140 and ground. The collector of this transistor is coupled through a resistor 144 to the base of an NPN type transistor 145, which has its collector coupled through a diode 146 and resistor 147 to terminal 140, and this collector is also coupled to the common connection between components 66, 67 and 69 in the first semiconductor switching circuit. A resistor 148 is coupled between the base and emitter of transistor 145, and the emitter is also coupled to negative energizing conductor 31b. This circuit is a third semiconductor switch. Like the others it includes a feedback pair of transistors 141, 145 intercoupled to provide a very rapid switching action.

In the lower left hand portion of FIG. 3 is a fourth semiconductor switch, including transistors 152 and 161 connected as a feedback pair to effectuate rapid switching. The override signal from circuit 18 is received over conductor 20 and junction 139, and passed over conductor 149 to one end of an "unload calibration" potentiometer 150, the other end of which is coupled to ground. The movable tap of potentiometer 150 is coupled through a resistor 151 to the base of a PNP type transistor 152. The emitter of transistor 152 is coupled through a Zener diode 153 to ground. A series circuit comprising resistor 154 and diode 155 is coupled between a reference terminal 156 and the common connection between the base of transistor 152 and resistor 151. A resistor 157 is coupled between junction 156 and ground. A pair of resistors 158, 160 are coupled in series between the collector of transistor 152 and conductor 31b. An NPN type transistor 161 has its collector coupled to junction 156, its base coupled to the common connection between resistors 158 and 160, and its emitter connected to conductor 31b.

Considering now current limiting circuit 18 shown in FIG. 4, conductors 25a and 25b are connected in the supply line (not shown) for the main motor (not the servo or adjusting motor) which drives the compressor. Thus primary winding 88 of transformer 90 receives a signal which is a function of the instantaneous main motor load, and passes this signal over secondary winding 91 to a rectifier bridge 92, connected in a conventional manner as shown to provide a D-C signal between conductor 93 and ground. A Thyrector diode 96 is coupled across secondary winding 91. A resistor 94 is coupled between conductors 93 and 95, and a capacitor 97 is connected between conductor 95 and ground. A potentiometer 98 which includes a movable arm 100 is coupled between conductor 95 and a resistor 101, the other side of which is grounded. Another potentiometer 102, one end of which is grounded, includes a movable arm 103 coupled to conductor 20. The other side of potentiometer 102 is coupled to movable arm 100 of potentiometer 98.

Potentiometer 98 is a "current set point" adjustment which permits adjustment of the current level which it is desired to maintain in the motor at a level between 40% and 100% of rated load. Potentiometer 102 is a "current calibration" adjustment. The initial setting of these potenitometers to provide the desired operation of relays 76 and 83 will be described hereinafter.

Turning now to the power supply circuit 27, alternating energy received over conductors 26a, 26b is applied to primary winding 104 of transformer 105, which includes a second winding 106 having a center tap which is coupled over conductor 107 to ground. Diodes 108, 110, 111, 112 are connected in a bridge circuit as shown to provide a unidirectional output potential between conductors 31a and 31b when an A-C voltage is applied between conductors 26a, 26b. A first filter capacitor 114 is connected between conductors 31a and 107 and a second filter capacitor 115 is connected between conductors 107 and 31b. A resistor 116 is connected between conductor 31a and conductor 30a, and a resistor 117 is connected between conductor 31b and conductor 30b. A pair of Zener diodes 118, 120 are connected in series as shown between conductors 30a, 30b and the common connection between the diodes is grounded.

A first voltage regulator circuit 121 includes a transistor 122 having its emitter-collector circuit coupled between conductors 28a and 31a, and its base coupled to the common connection between a capacitor 123, a Zener diode 124 and resistor 125. The other side of resistor 125 is coupled to conductor 31a, and the other sides of capacitor 123 and diode 124 are connected together and grounded.

A similar voltage regulating circuit 126 includes a transistor 127 having its emitter-collector path coupled between conductors 28b and 31b, and its base coupled to the common connection between a resistor 128, a Zener diode 130 and a capacitor 131. The other side of the resistor 128 is coupled to conductor 31b, and the other sides of diode 130 and capacitor 131 are grounded.

OPERATION OF THE INVENTION

With the system energized power supply 27 supplies D-C energy to the various circuits as already described, current limiting circuit 18 applies a signal over line 20 to the control circuit representing the level of current flow through the main motor which drives the compressor, and potentiometer 11 exhibits a resistance which is a function of the water temperature for the compressor. When the system load is precisely balanced with the setting of the vanes in the compressor inlet, arm 12 of potentiometer 38 is driven to a position which, balanced against the effective resistance of temperature-sensing potentiometer 11, applies a zero voltage level signal over switch 41 and conductors 14, 55 to the D-C amplifier circuit 15.

Assuming that the load on the system changes, the temperature of the water or fluid also changes and produces a consequent change in the effective resistance of potentiometer 11 to unbalance the illustrated bridge circuit in the input circuit. This unbalance produces an output signal which is passed over conductors 14, 55, amplified in D-C amplifier 15, and passed over conductor 16 to first junction 64 in control circuit 17. Assuming the temperature of the water increased, the amplified signal passed over conductor 16 to first junction 64 is a positive-going voltage that is applied through diode 65, resistor 66 and diode 67 to the base of transistor 68. As explained previously the feedback pair 68, 72 is rapidly driven into saturation as this first semiconductor switch is turned on. Current flows from power supply 27 over conductor 31a, the emitter-collector path of transistor 72, and winding 75 to energize relay 76. Relay 76 operates and its contact set 77 completes the circuit which drives vane adjusting motor 13 in the proper direction to increase the capacity of the system. As the vane angle is changed the connection from motor shaft 13 also drives potentiometer arm 12 in the proper direction to reduce the amplitude of the unbalanced signal provided by the input circuit until the bridge circuit is again balanced, signifying that the adjustment is exectly that required to compensate the increase in temperature.

In an analogous manner if the water temperature decreases, the bridge circuit is unbalanced in the opposite sense. An output signal is passed over conductors 14 and 55 to D-C amplifier 15, to provide a negative-going voltage signal at first junction 64, which signal is passed through diode 79 and resistor 80 to the base of transistor 81. Second semiconductor switch 81, 82 is rapidly gated on and current flows from ground, through winding 84, the collector-emitter path of transistor 82, and conductor 31b to the power supply. Relay 83 operates and at its contact set 85 completes a drive circuit to drive vane adjusting motor 13 in the direction opposite to that just described, that is, to adjust the vanes toward the minimum capacity position. Concomitantly with this blade adjustment a mechanical feedback signal represented by broken line 23 in FIG. 1 is translated into an electrical signal as arm 12 of potentiometer 35 is displaced, until the extent of this displacement offsets the change in resistance of potentiometer 11 to rebalance the bridge circuit and reduce the unbalance signal to zero. It is now manifest that the invention includes first and second semiconductor switches, 68, 72 and 81, 82, respectively, connected in opposite senses to respond to opposite polarities of the amplified output signal received at first junction 64, to drive the adjusting motor in the appropriate direction to increase or decrease the compressor capacity.

The third semiconductor switch 141, 145 operates to inhibit the first semiconductor switch 68, 72, and thus prevent additional loading of the machine, when the level of the override signal received at second junction 139 reaches a first level, indicating the main motor driving the compressor is drawing 100% of its rated current. The system is readied for operation by positioning the current set point potentiometer 98 at its 100% setting, and then running the machine up to 100% capacity, with the main motor drawing full current. Current calibration potentiometer 102 is then adjusted until the machine just stops loading, that is, the point at which relay 76 is de-energized and contact set 77 opens. This occurs as the negative-polarity signal passed from current limiting circuit 18 over conductor 20 and second junction 139 just reaches the amplitude requisite to actuate third semiconductor switch 141, 145. The polarity of the potential at the collector of transistor 145 rapidly goes negative, and this negative potential is injected between resistor 66 and diode 67, thus to inhibit the first semiconductor switch.

The fourth semiconductor switch 152, 161 is connected to actuate the second semiconductor switch 81, 82, and thus initiate unloading of the machine, when the level of the override signal received at second junction 139 increases by a given amount above the level at which relay 76 was de-energized. In more detail, after the adjustment procedures described in the preceding paragraph have been completed, the load on the machine is increased until the main motor is drawing 105% of its rated current. Then unload calibration potentiometer 150 is adjusted until fourth transistor switch 152, 161 is gated on. This action applies a negative-going signal over resistors 162, 80 to actuate the second transistor switch and close contact set 85.

Solely to assist those skilled in the art to make and use the invention with a minimum of experimentation, a table of component identification and values is set out below. That these are by way of example only will be evident to those skilled in the art in that various substitutions can readily be made. For example the opposite type of transistor (e.g., NPN for PNP) can be substituted for the ones illustrated, with the simultaneous reversal of the energizing and switching potentials, and the similar reversal of the sense of the associated unidirectional components such as diodes.

| Component: | Identification or Value |
| --- | --- |
| 54 | Nexus SQ10a. |
| 68, 82, 145, 161 | 2N3904. |
| 72, 81, 141, 152 | 2N3906. |
| 122 | 2N3053. |
| 127 | 2N4037. |
| 65, 67, 73, 78, 79, 87, 137, 146, 155 | B100. |
| 96 | G.E. 6RS20SP1B1. |
| 118, 120 | 1 M15T5. |
| 124, 130, 142, 153 | 1 M6.2T5. |
| 92 | I.R. 18DB1A. |
| 108–112 | I.R. 18DB1A. |
| 36 | 15 ohms. |
| 37 | 15 ohms. |
| 38 | 50 ohms. |
| 39 | 470 ohms. |
| 40, 49 | 510 ohms. |
| 47, 51 | 51K ohms. |
| 48, 50 | 10K ohms. |
| 52 | 150 ohms. |
| 56 | 120K ohms. |
| 61 | 50K ohms. |
| 66, 80 | 1.5K ohms. |
| 69, 157 | 30K ohms. |
| 70, 125, 128, 135, 144, 158 | 1K ohms. |
| 71, 94, 136, 148, 160 | 100 ohms. |
| 74, 86 | 1M ohms. |
| 98 | 3K ohms. |
| 101 | 2.7K ohms. |
| 102, 150 | 10K ohms. |
| 116, 117 | 220 ohms. |
| 138, 147, 151, 154, 162 | 5.1K ohms. |
| 97 | 100 μf., 50 v. |
| 114, 115 | 1,000 μf., 25 v. |
| 123, 131 | 100 μf., 15 v. |
| 143 | 25 μf., 15 v. |

Although only a particular embodiment of the invention has been described and illustrated it is manifest that various modifications and alterations may be made therein. It is therefore the intention in the appended claims to cover all such modifications and alterations as may fall within the true spirit and scope of the invention.

What is claimed is:

1. A control system for governing the operation of a compressor driven by a main electrical motor, with an adjusting motor connected to effect compressor loading and unloading as a function of the temperature of a controlled fluid, comprising:

an input circuit for providing an output signal which varies in accordance with the temperature of the controlled fluid comprising a temperature-sensing element electrically connected to provide resistance changes as a function of changes in the temperature of the controlled fluid, and a feedback element, electrically coupled in series with said temperature-sensing element and mechanically coupled to said adjusting motor, such that temperature changes of the fluid effect driving of the adjusting motor and consequent readjustment of the feedback element to rebalance the input circuit;

an amplifier circuit connected to amplify the output signal;

a control circuit connected to receive the amplified output signal, including switching means operable responsive to receipt of the amplified output signal to drive the adjusting motor to effect compressor loading and unloading;

a current limiting circuit, connected to provide an override signal related to the amplitude of current flowing to said main motor and to apply the override signal to prevent said control circuit from additionally loading the compressor after the main motor current reaches a predetermined level; and means for energizing said input, amplifier and control circuits to effect operation of the control system.

2. A control system as claimed in claim 1 and further comprising at least one additional temperature compensating element coupled in series with said feedback element and said temperature-sensing element in said input circuit for compensating the entire input circuit over at least a part of the system operating range.

3. A control system as claimed in claim 1 in which said control circuit includes a first junction at which the amplified output signal is received from the amplifier circuit, a first semiconductor switch and a second semiconductor switch connected in opposite senses for operation in response to opposite polarities of the amplified output signal, the first of said switches being operative to drive the adjusting motor in the direction of increased compressor capacity when the amplified output voltage is of a given polarity and the second semiconductor switch being operative to drive the adjusting motor in the direction of decreased compressor capacity when the amplified output voltage is of a polarity opposite said given polarity.

4. A control system as claimed in claim 3 wherein said control circuit further comprises a second junction for receiving said override signal from the current limiting circuit, a third semiconductor switch coupled between said second junction and said first semiconductor switch to inhibit operation of said first semiconductor switch and prevent further loading of the compressor when the override signal reaches a first level, and a fourth semiconductor switch coupled between said second junction and said second semiconductor switch to actuate said second semiconductor switch and effect unloading of the compressor after the main motor current reaches a second level which is greater than said first level.

5. A control system as claimed in claim 4 in which said current limiting circuit comprises at least one potentiometer for adjusting the amplitude of the override signal passed to the second junction in the control circuit.

6. A control system for governing the loading and unloading of a compressor driven by a main electrical motor, with an adjusting motor connected to adjust the positions of the compressor inlet vanes to regulate loading and unloading as a function of the temperature of a controlled fluid, comprising:
- a D-C input circuit including a bridge circuit for providing a single output signal which is a function both of the adjusting motor position and the ambient temperature of the controlled fluid, which bridge circuit comprises a resistive element exhibiting a change in resistance as a function of a change in the temperature of the controlled fluid, and a potentiometer electrically coupled in series with said resistive element and including a movable tap mechanically connected to provide complementary changes in its effective resistance portions as a function of a change in the adjusting motor position, temperature changes of the controlled fluid unbalancing the bridge circuit such that said output signal is produced and the adjusting motor is driven to adjust the vanes until the effective resistance changes in the potentiometer portions rebalance the bridge circuit;
- a D-C amplifier circuit connected to amplify said output signal;
- a control circuit, including first and second semiconductor switches coupled to a first junction, connected to actuate the first semiconductor switch when the amplified output voltage is of a given polarity and to actuate the second semiconductor switch when the amplified output voltage is of a polarity opposite said given polarity, thus to drive the adjusting motor and thereby modify the compressor vane positions;
- a current limiting circuit connected to provide an override signal which is a function of the amplitude of the current flowing in the main motor which drives the compressor and to apply the override signal over a second junction to said control circuit such that, as the current drawn by the main motor reaches rated value the override signal inhibits operation of the first semiconductor switch in the control circuit to prevent further loading of the compressor, and as the current drawn by the main motor exceeds the rated value by a predetermined amount the override signal effects operation of the second semiconductor switch in the control circuit to provide unloading of the compressor; and
- means for energizing said input, amplifier and control circuit to effect the desired regulation of the compressor.

7. A control system as claimed in claim 6 and further comprising at least one additional compensating potentiometer, connected in said bridge circuit such that a change in the effective resistance of said additional potentiometer unbalances the bridge circuit and drives the adjusting motor to change the complementary values of said potentiometer portions until the bridge circuit is again balanced.

8. A control system as claimed in claim 6 wherein said control circuit further comprises a third semiconductor switch coupled between said second junction and said first semiconductor switch and connected to inhibit operation of the first semiconductor switch to obviate loading of the compressor when the level of the override signal indicates that the value of current flowing in said main electrical motor is approximately the rated value, and a fourth semiconductor switch coupled between said second junction and said second semiconductor switch and connected to actuate said second semiconductor switch to initiate unloading of the compressor when the level of said override signal indicates that the level of the current drawn by the main electrical motor exceeds the rated level by a predetermined value.

9. A control system as claimed in claim 8 and including a pair of relays, each relay having a winding and a contact set, means for respectively coupling the relay windings with said first and second semiconductor switches to effect selective relay operation in accordance with the selective actuation of said semiconductor switches, and circuit means connecting said contact sets to regulate the direction in which the adjusting motor is driven in accordance with which of said relays is actuated.

10. A control system as claimed in claim 6 and further comprising a power supply circuit including a rectifier arrangement for receiving a A-C energy and providing D-C voltage for application over said means for energizing the D-C amplifier and control circuits, said power supply including a voltage regulating arrangement for producing a well-regulated D-C voltage for application over said means for energizing the input circuit.

11. A control system as claimed in claim 7 wherein said means for energizing the input circuit includes a first conductor coupled to a first input connection of said bridge circuit and a second conductor coupled to the other input connection of said bridge circut, said input circuit includes a manual/automatic selector switch provided with at least four fixed contacts and a movable contact for engaging one of the four fixed contacts, means for coupling said first fixed contact to said movable tap of the first-mentioned potentiometer to effect automatic system operation, means including a first voltage divider arrangement for coupling said second fixed contact to said first conductor to provide an output signal for driving said adjusting motor in a first direction, means for coupling said third fixed contact to maintain the control system in a static condition, means including a second voltage divider arrangement for coupling said fourth fixed contact to said second conductor to provide an output signal for driving the adjusting motor in a second direction opposite said first direction, and means for coupling said movable contact to said D-C amplifier circuit to pass the output signal to the D-C amplifier circuit.

References Cited
UNITED STATES PATENTS

| | | | |
|---|---|---|---|
| 2,353,201 | 7/1944 | Talbot | 230—114 X |
| 1,783,036 | 11/1930 | Crawford | 103—11 X |
| 2,590,022 | 3/1952 | Larkin | 103—11 |
| 3,170,125 | 2/1965 | Thompson. | |
| 3,209,277 | 9/1965 | Burwen. | |
| 3,363,573 | 1/1968 | Jaeger | 103—25 |
| 3,408,940 | 11/1968 | McGrogan | 103—25 |
| 3,424,370 | 1/1969 | Law | 230—5 |

WILLIAM L. FREEH, Primary Examiner

U.S. Cl. X.R.

230—7, 8, 24